United States Patent [19]

Shah

[11] Patent Number: 4,707,518
[45] Date of Patent: Nov. 17, 1987

[54] RUBBER-MODIFIED EPOXY ADHESIVES

[76] Inventor: Dilipkumar N. Shah, 4121 Canterbury Dr., Erie, Pa. 16506

[21] Appl. No.: 919,523

[22] Filed: Oct. 16, 1986

[51] Int. Cl.⁴ .................... C08L 9/02; C08G 59/68
[52] U.S. Cl. ................................. 525/122; 528/91; 528/92
[58] Field of Search .............. 525/119, 122; 528/91, 528/92

[56] References Cited

U.S. PATENT DOCUMENTS

| | | | |
|---|---|---|---|
| 2,879,252 | 3/1959 | Been et al. | 525/119 X |
| 3,395,121 | 7/1968 | Pfann et al. | 528/91 |
| 3,855,176 | 12/1974 | Skidmore | 525/122 X |
| 3,894,113 | 7/1975 | Pagel | 525/122 X |
| 4,275,190 | 6/1981 | Dudgeon | 525/122 X |
| 4,338,225 | 7/1982 | Sheppard | 525/122 |

OTHER PUBLICATIONS

"Boron trifluoride-amine adducts as hardeners for epoxies" by C. H. Smith; *Modern Plastics*, Mar., 1969.
"Adhesive and Electrical Properties of BF₃ Cured Elastomer Modified Epoxies" by J. W. Hill, *Leepoxy Plastics*, Inc. of Fort Wayne, Indiana.

*Primary Examiner*—Earl Nielsen

[57] ABSTRACT

Epoxy adhesive compositions which are suitable for use in bonding metal and SMC parts to other metal and SMC parts comprise, in admixture, an epoxy resin, the adduct of an epoxy resin and a reactive (meth)acrylonitrile/butadiene rubber and a mixture of Lewis acid complexes having different cure times. The adhesive can be cured at elevated temperatures in 5 minutes or less.

3 Claims, No Drawings

RUBBER-MODIFIED EPOXY ADHESIVES

This invention relates to epoxy adhesives. More particularly, the invention relates to two-part epoxy adhesive compositions which are adapted for mixing at time of use and which cure rapidly at elevated temperatures while having an adequate pot life at room temperature. The adhesives of the invention are characterized by improved flexibility at low temperatures and higher adhesive strength at elevated temperatures. The adhesives are particularly useful for bonding metal and plastic materials, including fiber-reinforced plastics, to the same or different materials, including plastics, fiber reinforced plastics, glass, ceramics and metals. Bonding can be effected without extensive pretreatment of substrate surfaces.

Epoxy adhesive compositions have been widely employed as structural adhesives for bonding a variety of substrates, including metals, plastics, glass, ceramics and wood. The epoxide compounds typically contain more than one oxirane group and are readily transformed from a liquid or viscous state to thermoset solids. This transformation or curing is accomplished by the addition of curing agents. Some curing agents act catalytically, and some participate directly in the curing reaction and are absorbed into the resin chain. The rate of cure and product characteristics are influenced by the choice of curing agent, which itself is influenced by the make-up of the adhesive composition, as dictated by the final properties desired by the user.

The epoxy adhesives are especially suited for metal-to-metal bonding applications, with lesser modification than is required for bonding plastic materials. Despite their many good points, e.g., dissimilar materials may be joined and galvanic corrosion significantly reduced; leakproof and chemically resistant joints can be fabricated, and cure can often be accomplished without the application of pressure because of the minimal amounts of volatiles which are evolved during the cure, the epoxy adhesives are not without drawback. Epoxy adhesives are expensive, difficult to process, good joint design is required for maximum adhesion, peel, cleavage and impact strengths are adversely affected by increases in temperature and careful surface preparation is required for optimum results.

The automobile industry is in the throes of transition from automobiles made primarily from steel to those having increasing amounts of thermoplastic and thermoset plastic materials, with the automobiles being made on automated production lines with a minimum of hand labor, at production speeds equal to the speeds at which the former "steel" automobiles have been made. This need for speed is a nightmare for the adhesive formulator. He is faced with providing an adhesive capable of bonding dissimilar materials at rapid line speeds, while maintaining a reasonable pot life, to obtain an adhesive bond which is at least as strong as the weaker of the materials being bonded while maintaining bond integrity at elevated temperatures such as are encountered in paint bake cycles without causing any distortion of the bonded assembly and at temperatures below $-20°$ C., all this without requiring extensive surface preparation of any substrate materials.

Surface preparation is a critical aspect with respect to the use of epoxy-resin adhesives. In most instances, the surfaces which are to be adhesively joined should be free of all grease and loosely-held contaminants. In some cases, a chemical treatment, such as a corona discharge, may be required to obtain an effective bond, in others, primers may be necessary. Generally, sufficiently clean surfaces can usually be obtained by solvent degreasing, or by wire brushing or sandblasting in combination with solvent wiping. In addition, once cleaned, the surface must be protected from contamination, including body oils which can adhere to the substrate during handling. Not only does this need for cleanliness increase the cost of manufacturing with an accompanying reduction in productivity, but it also affects worker safety and morale in their exposure to solvent vapors and dust which evolve during cleaning. It is apparent that epoxy adhesives which require minimal surface preparation, which cure rapidly, have good application viscosity, resistance to paint bake cycles, good environmental resistance, resistance to embrittlement at low temperatures, long pot-life and easy clean-up are desired.

In accordance with the present invention, there are provided novel multi-part adhesive formulations which comprise, following admixture of the individual parts, at least one first epoxy resin characterized by the presence of more than one oxirane group; at least one adduct formed by the reaction of at least one second epoxy resin having more than one oxirane group and at least one reactive elastomeric material which contains at least two groups which are reactive with the oxirane group, said adduct being characterized by the presence of more than one oxirane group and having a rubber content in the range from 5 to 40 percent by weight, based on the total weight of said first epoxy resin and said adduct; and an effective amount of a particular mixture of Lewis acid complexes.

The epoxy compounds which are suitable for use in the practice of the invention can be any monomeric or polymeric compound or mixtures of compounds having an epoxy equivalency greater than one, that is, wherein the average number of epoxy groups per molecule is greater than one, with monomeric epoxides having two epoxy groups being currently preferred. Epoxy compounds are well-known, see, for example, U.S. Pat. Nos. 2,467,171; 2,615,007; 2,716,123; 3,030,336; and 3,053,855. Useful epoxy compounds include the polyglycidyl ethers of polyhydric polyols, such as ethylene glycol, triethylene glycol, 1,2-Opropylene glycol, 1,5-pentanediol, 1,2,6-hexanetriol, glycerol and 2,2-bis(4-hydroxy cyclohexyl) propane; the polyglycidyl esters of aliphatic or aromatic polycarboxylic acids, such as oxalic acid, succinic acid, glutaric acid, terephthalic acid, 2,6-naphthalene dicarboxylic acid and dimerized linoleic acid; the polyglycidyl ethers of polyphenols, such as bis-phenol A, 1,1-bis(4-hydroxy phenyl) ethane; 1,1-bis(4-hydroxyphenyl) isobutane, and 1,5-dihydroxynaphalene; and novolak resins; with the aromatic and cycloaliphtic polyglycidyl compounds being currently preferred.

These same epoxy resins are employed in forming the epoxy-rubber adducts which are an essential element of this invention. In forming the adducts, the epoxy compound is reacted with a liquid butadieneacrylonitrile or (meth)acrylonitrile copolymer having at least two groups which are reactive with epoxy groups, including carboxyl, hydroxyl, mercapto and amino in a ratio of two moles of epoxy compound per mole reactive liquid butadiene-(meth)acrylonitrile copolymer. This copolymer is combined with non-rubber-modified epoxy resin in an amount to provide from 5 to 40, preferably 8–25, parts by weight of butadiene-(meth)acrylonitrile copolymer per 100 parts of total epoxy weight. In addition the copolymer should have an (meth)acrylonitrile content in the range from 5 to 40, preferably 12 to 26, percent by weight, based on the weight of reactive liquid butadiene-(meth)acrylonitrile copolymer.

The functional butadiene-(meth)acrylonitrile elastomeric copolymers having carboxyl, hydroxyl, mercapto and amino graps are well known articles of commerce and need not be discussed here in great detail. Typically, the reactive butadiene-(meth)acrylonitrile liquid elastomer is mixed with a stoichiometric excess of the epoxy resin and heated to a temperature in the range from 150°-200° C., generally in the presence of a catalyst such as triphenyl phosphine. Generally, reaction times on the order of one hour are sufficient. The rubber containing reactive groups react with the epoxy resin to produce linear epoxy-rubber chains with epoxy-functionality.

Lewis acid complexes are well-known. In a general sense, the Lewis acid complexes can be considered as the products of an electron acceptor (Lewis acid) and an electron donor (a basic material). The Lewis acid-type materials which are suitable for use in forming complexes for use in the present invention are the anhydrous halide salts of elements such as boron, aluminum, silicon, tin, antimony and titanium. Preferably, the non-halide component of the Lewis acid is in its highest normal oxidation state. Specific Lewis acids which are suitable for use in the invention are silicon tetrachloride, aluminum trichloride, aluminum tribromide, boron trifluoride, antimony. pentachloride, titanium tetrachloride and tin tetrachloride. These acids are combined with basic amines, ethers, hydroxy-containing compounds and the like to form the Lewis acid complexes which are employed as curing agents in this invention. Representative basic materials include aniline, M-phenetidine, N-anisidine, 2,4-dichloroaniline, menthane diamine, diethylenetriamine, $N,N$1-dimethyl-p-toluidine, piperidine, tetrahydrofuran, diethyl ether, dimethyl ether, monoethanolamine, glycerol, ethylene glycol, propylene glycol and triethylene glycol. In general, the complexes may be prepared by dissolving the electron donor compound in a suitable solvent such as benzene. The anhydrous Lewis acid is added under anhydrous conditions to the electron donor compound solution. A precipitate is formed which is filtered from the solution, dried and commuted to a powder form. As noted, Lewis acid complexes are well known and are commercially available from readily ascertainable sources. Boron trifluoride-amine complexes are currently preferred materials. The Lewis acid complexes are employed in amounts in the range from 1 to 20, preferably 3 to 12 percent by weight, based on total weight of epoxy-functional materials.

As noted, the adhesive compositions of this invention are cured employing a particular mixture of Lewis acid complexes. More particularly, the curing agent comprises an admixture of at least two different Lewis acid complexes, the gel time of one of said different Lewis acid complexes being different from and less than the gel time of the other. The term "gel time" is used herein in its art-recognized sense and is the gel time or pot life in 150 g mass in air at 25° C. for room temperature curing catalysts or the working life in 150 g mass in air at 25° C. for elevated temperature curing catalysts. More particularly, the curing agent comprises an admixture of a first Lewis acid complex having an activation temperature in the range from room temperature to 38° C. and a gel time of 5 minutes or less and a second Lewis acid complex having an activation temperature in the range from 40° C. to 105° C. and a gel time greater than 45 minutes, wherein the ratio of said first Lewis acid complex to said second Lewis acid complex is in the range from 0.6–2.4:1, to provide a catalyst mixture having an epoxy resin gel time of 30 minutes or more, preferably 60 minutes to 3 hours.

The adhesives can contain conventional additives normally found in epoxy adhesives, such as talc, metal powders, titanium dioxide, and the like. Such additives are incorporated in levels well known to practioners in the art of epoxy adhesives.

In production, the adhesives are provided as two part compositions, with a first part containing the epoxy resin and epoxy-rubber adduct and the second part containing the mixture of Lewis acid complexes. The parts are metered and mixed together immediately before use. After mixing, the adhesive is sufficiently viscous to form a discrete bead when extruded onto a surface and has a pot life of at least 30 minutes at ambient temperatures. The adhesives are curable at temperatures in the range from 70° C. to 190° C., at which temperatures cure is effected in 5 minutes or less.

The adhesives are prepared following conventional techniques such as folding and shear mixers. In forming the adhesives, there will be employed from 25 to 70, preferably 45 to 60, parts by weight of unmodified epoxy resin and from 30 to 75, preferably 40 to 55, parts by weight of epoxy-rubber adduct. As noted, supra, the epoxy-rubber adduct will provide a rubber content in the range from 5 to 40, preferably 8–25 percent by weight, based on total weight of unmodified epoxy resin and epoxy-resin adduct. The cure of the epoxy resin composition by Lewis acid complexes is catalytic and one can employ mixing ratios of the individual packs which are similar to those commonly used in the art.

The adhesives of the invention are suited to bond metals and fiber-reinforced unsaturated polyester sheet molding compound to other metal and fiber-reinforced sheet molding compound parts. Fiber reinforced sheet molding compound, commonly referred to as SMC, can be described as reinforced resin compositions typically comprising unsaturated liquid polyester resin, ethylenically-unsaturated monomer, low profile thermoplastic resin, inert filler, magnesium oxide or other maturation acids and shaped or milled glass fiber reinforcement. The molding of the SMC under appropriate conditions of heat and pressure results in the formation of a rigid, self-supporting, thermoset, fiber-reinforced SMC part. A bead of adhesive is applied to at least one of the metal or SMC surfaces which are to be bonded, the parts are mated together and the mated assembly is heated at a temperature in the range from 70° to 190° with cure typically being effected in 5 minutes or less. While the adhesive can be applied by any conventional method such as roll coater, brush, extrusion and hand rollers, robotic dispensing machines are preferred.

The following examples are illustrative of the invention.

EXAMPLE I

A first mixture is prepared by blending 61.2 g bisphenol A epoxy resin (Epon 828, Shell Chemical Co.), 802 g epoxy adduct of carboxylated butadiene/acrylonitrile liquid rubber (X-834, Wilmington Chemical), 3.6 g diethylene glycol, 6.5 g silica, 2.4 g titanium dioxide, 38.4 g powdered aluminum and 47.5 g talc. A second mixture is prepared by blending 22.3 g of Lewis acid complex having a gel time in excess of 60 minutes (Anchor 1170, Pacific Anchor Chemical Corp.), 5.8 g of Lewis acid complex having a gel time of less than 5 minutes (Anchor 1873, Pacific Anchor Chemical Corp.), 61.9 g polyethylene glycol (400 MW), 8.4 g silica, 91.2 g powdered aluminum and 50.4 g talc.

The adhesive is used to bond SMC parts to metal supporting members. The parts were wiped with an organic solvent-saturated cotton cloth and the mixed adhesive (3:1, Part 1/Part 2) is applied at a dry film thickness of 1.0 mill. The bonded assemblies are heated at 93° C. for 4 minutes. After the initial cure, all parts are post-cured at 149° C. for 30 minutes. All parts are acceptable, both with respect to physical appearance and bond performance.

EXAMPLE II

Following the procedure of Example I, 103.5 g epoxy resin (Epon 828), 96.1 g epoxy-rubber adduct (X-834), 5.0 g diethylene glycol, 9.3 g silica, 3.3 g titanium dioxide and 113.9 g talc are mixed to provide a first mixture. A second mixture is prepared by blending 27 g Lewis acid complex having a gel time in excess of 60 minutes (Anchor 1170), 12.5 g Lewis acid complex having a gel time of less than 5 minutes (Anchor 1973), 88 g polyethylene glycol (400 MW), 9.9 g silica, 125.8 g powdered aluminum and 67.9 g talc.

The first and second mixtures are combined and the mixture is employed to bond SMC to SMC. The SMC parts are wiped with a dry cotton rag and the adhesive is applied to one substrate at a dry film thickness of 1.0 mil. A second substrate mated to the adhesive-coated member and the assembly is cured at 90° C. for 3 minutes. Lap shear tests made after three weeks and water immersion tests made after 7 days immersion in water at 54.5° C. gave the following results:
3 Week Lap Shear:697 psi; 100 FT.
Water Immersion:649 psi; FT/SB
FT.=Fiber tear; SB=Stock break.

What is claimed is:
1. An epoxy resin composition comprising:
    (a) At least one epoxy-functional adduct of an epoxy resin having more than one epoxy group and a rubber modifier selected from the group consisting of copolymers of butadiene and at least one monomer selected from the group consisting of acrylonitrile and methacrylonitrile, said rubber modifier being characterized by the presence of at least two functional groups which are reactive with an epoxide group said adduct being further characterized by the presence of more than one epoxy group; and
    (c) a curing agent consisting essentially of a mixture of at least two different Lewis acid complexes, the gel time of one of said different Lewis and complexes being different from and less than the gel time of the other.
2. An epoxy resin composition according to claim 1 where said curing agent comprises an admixture of a first Lewis acid complex having an activation temperature in the range from room temperature to 38° C. and a gel time of less than 5 minutes and a second Lewis acid complex having an activation temperature in the range from 40° C. to 105° C. and a gel time greater than 60 minutes wherein the ratio of said first Lewis acid complex to said second Lewis acid complex is in the range of 0.6–2.4:1; said epoxy resin composition having a gel time in excess of 30 minutes.
3. An epoxy resin composition according to claim 2 wherein the amount of said rubber modifier is in the range from 5 to 40 weight percent, based on total weight of epoxy resin and epoxy-functional adduct.

* * * * *